United States Patent [19]

Summers

[11] Patent Number: 5,248,997
[45] Date of Patent: Sep. 28, 1993

[54] FACET REFLECTANCE CORRECTION IN A POLYGON SCANNER

[75] Inventor: Drew D. Summers, Rochester, N.Y.
[73] Assignee: Eastman Kodak Company, Rochester, N.Y.
[21] Appl. No.: 783,589
[22] Filed: Oct. 28, 1991
[51] Int. Cl.$^5$ .......................... H04N 1/21; B41J 2/47
[52] U.S. Cl. ..................... 346/108; 359/217
[58] Field of Search .............. 346/108, 76 L, 160, 346/1.1; 358/296; 359/216, 217

[56] References Cited

U.S. PATENT DOCUMENTS

| | | |
|---|---|---|
| 4,204,233 | 5/1980 | Swager . |
| 4,257,053 | 3/1981 | Gilbreath ........................... 346/108 |
| 4,320,420 | 3/1982 | Rider . |
| 4,717,925 | 1/1988 | Shibata et al. ...................... 346/108 |
| 4,733,064 | 3/1988 | Ishikawa ............................ 250/201 |
| 4,833,488 | 5/1989 | Byung-Sik ........................ 346/108 |
| 4,884,083 | 11/1989 | Loce et al. ........................ 346/108 |

Primary Examiner—Mark J. Reinhart
Attorney, Agent, or Firm—William F. Noval

[57] ABSTRACT

In a laser imaging apparatus including a multifaceted polygon scanner, a technique for correcting facet reflectance differences to effect uniform laser light power output for all scanner facets. A set of facet reflectance look-up tables are determined as follows. Determine the relative reflectance for each facet of the polygon scanner. Calculate gain factors referenced to the minimum relative reflectance. Determine the relationship between laser power and DAC code value for the minimum reflectance facet for a number of measured values. Calculate this relationship for all $2^n$ DAC code values to produce a look-up table for the minimum reflectance facet. Shift the laser powers by the relative reflectance for each other facet of the polygon scanner and back calculate the DAC code values that would yield the same laser powers as the minimum reflectance facet to produce look-up tables for the other facets.

4 Claims, 2 Drawing Sheets

FACET REFLECTANCE CORRECTION IN A POLYGON SCANNER

FIELD OF INVENTION

In general, this invention relates to light beam imaging apparatus. More particularly, this invention relates to a technique for correcting reflectance differences in a multifaceted polygon scanner used in light beam imaging apparatus.

BACKGROUND OF THE INVENTION

Light beam imaging apparatus, such as laser imaging apparatus, are widely used in applications in which an information medium (such as film, paper, stimulable storage phosphor) is scanned to produce an electronic image signal or in which an electronic image signal is reproduced in a photosensitive medium, such as film. Typically, the laser beam is scanned by an oscillating mirror or multifaceted polygon scanner (mirror) in a line direction across the medium as the medium is moved in a direction perpendicular to the line scan direction. Where a multifaceted polygon scanner is used, facet to facet errors may result in undesirable line to line variations in the scanned or reproduced image. Such variations cause image artifacts and degradation. The following patents disclose various proposals to correct for facet-to-facet errors relating to laser beam spot size, laser beam scanning speed, clock frequency, etc., but not for facet-to-facet reflectance errors.

U.S. Pat. No. 4,257,053, issued Mar. 17, 1981, inventor C. R. Gilbreath;

U.S. Pat. No. 4,204,233, issued May 20, 1980, inventor G. E. Swager;

U.S. Pat. No. 4,320,420, issued Mar. 16, 1981, inventor R. E. Rider;

U.S. Pat. No. 4,717,925, issued Jan. 5, 1988, inventors I. Shibata et al.;

U.S. Pat. No. 4,833,489, issued May 23, 1989, inventor C. Byung-Sik; and

U.S. Pat. 4,733,064, issued Mar. 22, 19899, inventor H. Ishikawa.

It is thus desirable in a light beam imaging apparatus using a multifaceted polygon scanner to provide facet-to-facet reflectance correction in order to effect uniform line-to-line scanning and to minimize image artifacts and degradation resulting from facet reflectance differences.

SUMMARY OF THE INVENTION

According to the present invention, there is provided a technique for correcting for facet reflectance differences in a continuous tone polygon scanner imaging apparatus. The technique effects uniform output laser power from each of the polygon scanner facets.

According to an aspect of the present invention, a technique for producing a set of output look-up tables to correct for facet reflectance differences in a multifaceted polygon scanner imaging apparatus includes the steps of determining the relative reflectance of each facet of the polygon scanner, determining the relationship between laser power and DAC code value for the minimum reflectance facet, calculating this relationship for all $2^n$ DAC code values to produce a look-up table for the minimum reflectance facet, shifting the laser powers by the relative reflectance for each other facet of the polygon scanner and back calculating the DAC code values that would yield the same laser powers as the minimum reflectance facet to produce look-up tables for the other facets of the polygon scanner.

DESCRIPTION OF THE PREFERRED EMBODIMENTS

Figure 1:
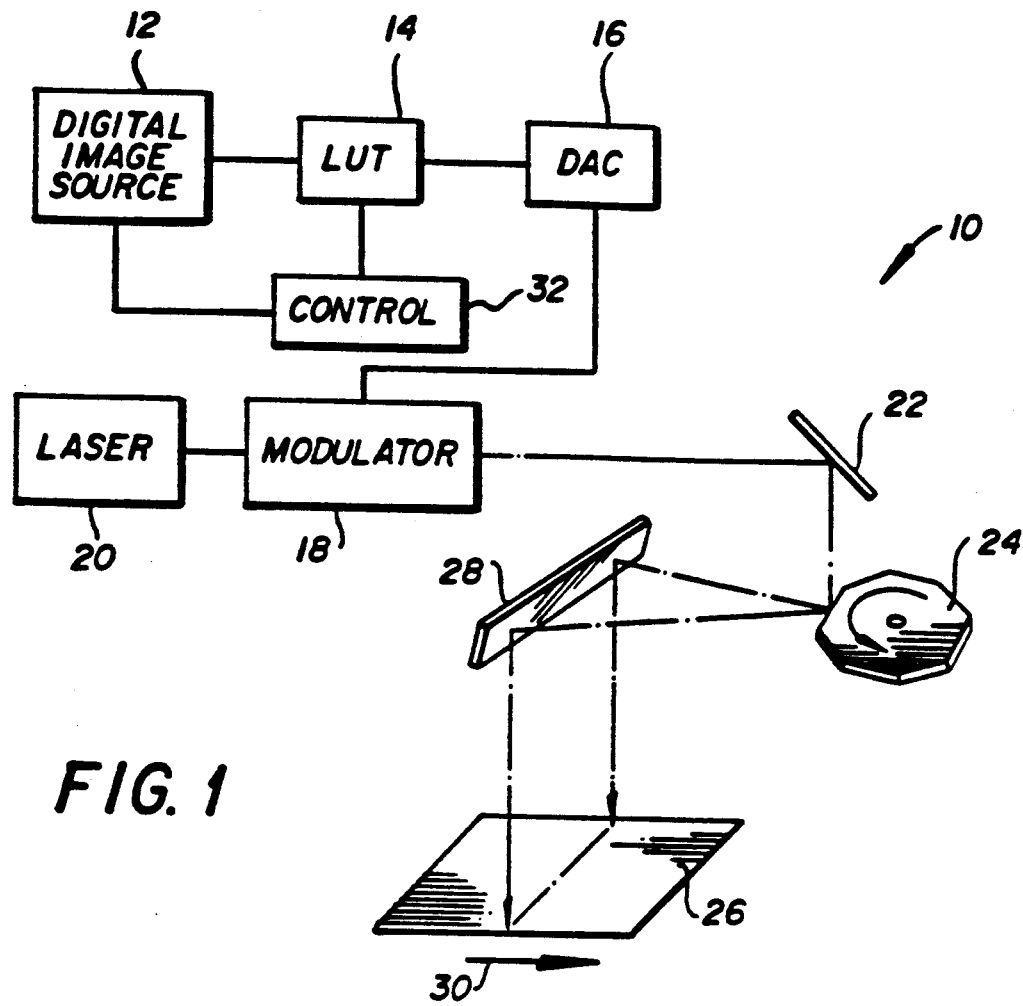
FIG. 1 a partially block, partially diagrammatic view of laser imaging apparatus including an embodiment of the present invention.

Referring now to FIG. 1 there is shown laser imaging apparatus including an embodiment of the present invention. As shown, laser imaging apparatus 10 is a continuous tone, polygon scanning laser printer. Digital image source 12 provides a digital image including pixels having a range of digital values corresponding to the tonal range of an original image. If, for example, each pixel has a tonal range of 12 bits, the code value of the pixel can range from a value of "0" to a value of "4095". Preferably the digital image provided by source 12 is a digital x-ray image such as produced by a diagnostic imaging modality (CT, MRI, US, PET), or by digitizing x-ray film.

The digital image is calibrated for film density and facet reflectance differences by a set of look-up tables—LUT 14 which are obtained according to the technique of the present invention (which will be explained in greater detail below).

LUT 14 produces a calibrated digital signal which is applied to digital-to-analog converter (DAC) 16 to produce an analog signal which is applied to modulator 18. A laser beam from laser 20 is modulated by modulator 18 as a function of the analog image signal from DAC 16. The modulated laser beam is reflected by mirror 22 to multifaceted polygon scanner 24 which rotates to scan the modulated laser beam in a line scan across photosensitive medium 26 after reflection from mirror 28. Medium 26 is moved in the direction of arrow 30 to effect line-by-line scanning thereof. Apparatus 10 is controlled by computer control 32 which includes a digital processor such as a microprocessor.

Figure 2:
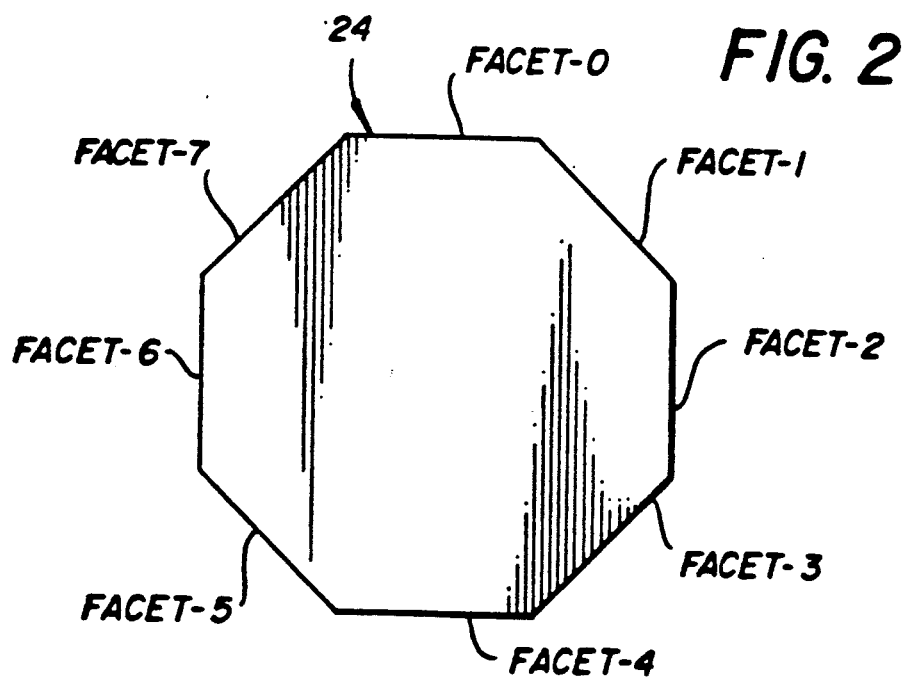
FIG. 2 is a plan view of the polygon scanner of FIG. 1.

As shown in FIG. 2, polygon scanner 24 includes a plurality (e.g., eight) of mirror facets identified as FACET 0, FACET 1, ..., FACET 7. Because of facet reflectance differences between the facets of scanner 24, laser beam light power differences can occur at medium 26 on a scan line by scan line basis. Unless corrected, these light power differences cause artifacts and degradation in the image produced in medium 26. According to the present invention, the polygon facet reflectance differences are corrected by means of a set of look-up tables which correct the digital image signal applied to DAC 16 such that the same laser light power is applied to medium 26 after reflectance from each facet. The set of facet reflectance correction look-up tables (LUTs) are determined as follows:

In the following example, the digital image pixel is assumed to have a value within the range of 0 to $2^n-1$ where n is the pixel bit depth. For a 12 bit pixel, the DAC code value (cv) will range from 0 to 4095.

Step 1

Collect relative facet reflectance values for each facet of scanner 24. The first facet, facet 0, is the reference facet. Facet 0 is the facet in which the polygon index occurs. It is assigned a relative reflectance value of 1. All other facets of scanner 24 are measured relative to facet 0. The relative facet reflectance values are measured with an external test fixture. Table 1 tabulates relative reflectance values determined from an exemplary polygon scanner.

TABLE 1

| Facet | Re. Refl. |
|---|---|
| 0 | 1.0000 |
| 1 | 0.9985 |
| 2 | 1.0011 |
| 3 | 1.0008 |
| 4 | 0.9969 |
| 5 | 0.9995 |
| 6 | 0.9996 |
| 7 | 0.9990 |

Step 2

Calculate the gain factors referenced to the minimum relative reflectance. Find the minimum relative reflectance facet of scanner 24. Divide all the other facet relative reflectance values by the minimum relative reflectance value. The new values are the gain factors that are used to scale the laser power for all other facets but the minimum relative reflectance facets. Table 2 tabulates the gain factors determined for the exemplary polygon scanner.

TABLE 2

|  | Facet | Rel. Refl. | Gain Factor |
|---|---|---|---|
| Min. | 0 | 1.0000 | 1.0031 |
|  | 1 | 0.9985 | 1.0016 |
|  | 2 | 1.0011 | 1.0042 |
|  | 3 | 1.0008 | 1.0039 |
|  | 4 | 0.9969 | 1.0000 |
|  | 5 | 0.9995 | 1.0026 |
|  | 6 | 0.9996 | 1.0027 |
|  | 7 | 0.9990 | 1.0021 |

Step 3

Collect laser power data points referenced to the digital signal code value applied to DAC 16 and normalize the laser power light values to the laser power at DAC code value=4095. The normalization removes the effect of linear gain errors in the measurement system. The data points can be collected externally or by an exposure calibration system installed in apparatus 10. The number of points may typically include 83 data points (see Table 3).

TABLE 3

| | Measured Laser Power Table | |
|---|---|---|
| DAC cv | Laser Power | Norm. Laser Power |
| 0 | 75 | 0.0093 |
| * | * | * |
| 4050 | 7200 | 0.8889 |
| 4095 | 8100 | 1.0000 |

Step 4

Interpolate the normalized laser powers for all DAC code values between [0,4095]. It is assumed that this full table represents the relationship between DAC code value and normalized laser power for the minimum relative reflectance facet of scanner 24. All other facets of scanner 24 will have their DAC code values adjusted to match the 4096 normalized laser powers of the minimum reflectance facet, Facet 4. The 4096 interpolated normalized laser powers are called the desired normalized laser powers (see Table 4).

TABLE 4

| Interpolated Normalized Laser Power Table 4096 Elements | |
|---|---|
| DAC cv | Desired Norm. Laser Power |
| 0 | 0.0093 |
| 1 | 0.0094 |
| * | * |
| 4094 | 0.999 |
| 4095 | 1.0000 |

Step 5

For the other facets of scanner 24, multiply all elements of the measured normalized laser power by the facet's gain factor.

Step 6

For the other facets of scanner 24, interpolate the DAC code values for all the desired normalized laser powers using the ordered pairs of DAC code values and gain factor scaled measured laser power table as the table points for the interpolation. Truncate all negative DAC code values to 0. There should never be a DAC code value greater than 4095 because the gain factor are all greater than or equal to 1. Record the interpolated DAC code values into the DAC code value facet reflectance table (see Table 5).

TABLE 5

| DAC Code Value Facet Reflectance Table 8*4096 Elements | | | | | | | |
|---|---|---|---|---|---|---|---|
| Facet 0 | Facet 1 | Facet 2 | Facet 3 | Facet 4** | Facet 5 | Facet 6 | Facet 7 |
| 0 | 0 | 0 | 0 | 0 | 0 | 0 | 0 |
| 1 | 1 | 1 | 1 | 1 | 1 | 1 | 1 |
| * | * | * | * | * | * | * | * |
| 997 | 998 | 996 | 996 | 1000 | 997 | 997 | 998 |
| * | * | * | * | * | * | * | * |
| 4083 | 4089 | 4078 | 4079 | 4095 | 4085 | 4084 | 4087 |

** = minimum reflectance facet

The interpolation procedure may be effected by computer control 32 using the following general interpolation algorithm.

Define:

interpolate ($\{x_1y_1\},\{x_2\}$) returns $\{y_2\}$

Step 6 is then effected by the following specific interpolation algorithm.

interpolate ({gain*measured norm laser power, DAC-0—DAC-4095}, {desired norm laser power}) returns {facet corrected DAC values}

Figure 3:
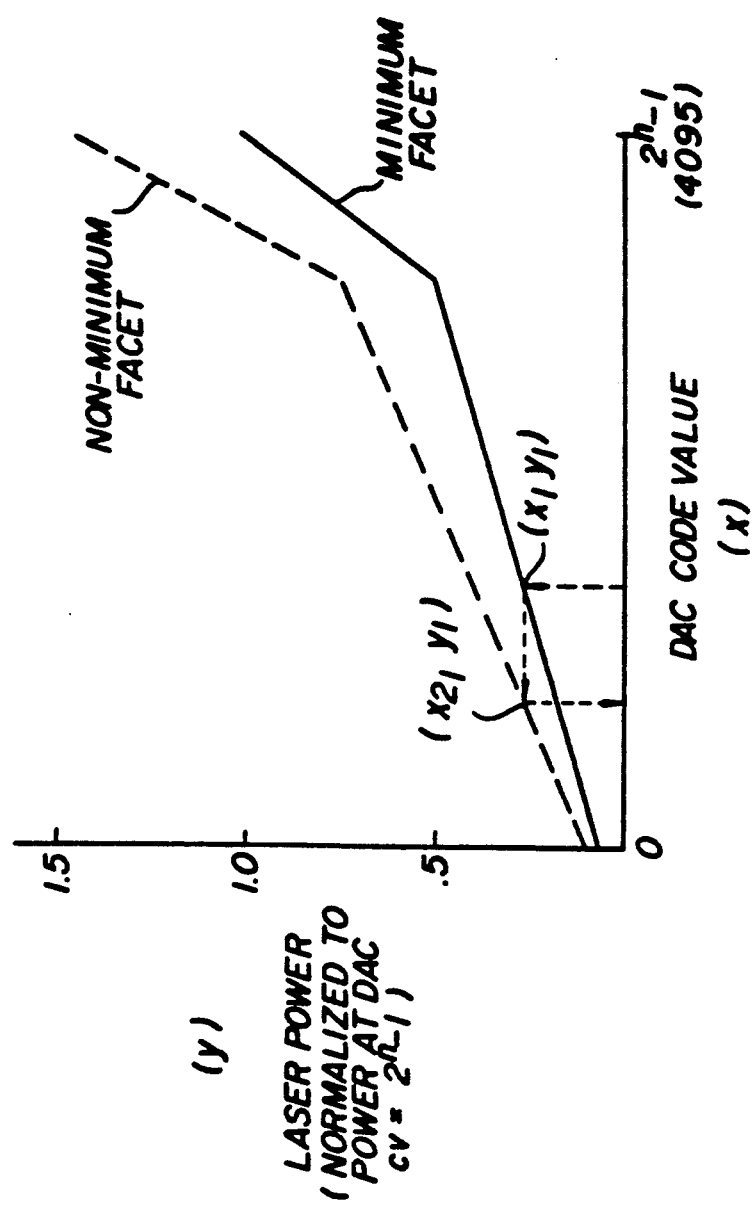
FIG. 3 is a plot of DAC code value versus Laser Power useful in explaining an aspect of the present invention.

The interpolation procedure is illustrated with reference to FIG. 3. The solid line represents the relationship of DAC code value versus laser power normalized at DAC code value=$2^n-1$ for the minimum reflectance facet of a polygon scanner. The dashed line represents the relationship of DAC code value versus normalized laser power for a non-minimum example) For the same laser power at $(x_1y_1)$ where x=DAC cv and y=laser power, for the minimum reflectance facet, by interpolation to the non-minimum reflectance curve, a DAC cv of $x_2$ is determined. Each DAC cv for each non-minimum reflective facet is determined in the same way using the foregoing interpolation algorithm.

Step 7

Merge the DAC code value facet reflectance table with a density calibration table (which calibrates the density of medium 26 to DAC code value) into the facet output look-up table. Use the DAC code value of the density table as a pointer to the correct DAC code value in the DAC code value facet reflectance table for each facet. The DAC code value can be used as a pointer because, in step 4, the minimum reflectance facet DAC code values were linearly set from 0 to 4095.

TABLE 6

Density Table

| Density Code Value | DAC cv |
|---|---|
| 0 | 0 |
| 1 | 0 |
| * | * |
| 800 | 1000 |
| * | * |
| 4095 | 4095 |

TABLE 7

| Code Value | Facet 0 | Facet 1 | Facet 2 | Facet 3 | Facet 4 | Facet 5 | Facet 6 | Facet 7 |
|---|---|---|---|---|---|---|---|---|
| 0 | 0 | 0 | 0 | 0 | 0 | 0 | 0 | 0 |
| 1 | 1 | 1 | 1 | 1 | 1 | 1 | 1 | 1 |
| * | * | * | * | * | * | * | * | * |
| 800 | 997 | 998 | 996 | 996 | 1000 | 997 | 997 | 998 |
| 4095 | 4083 | 4089 | 4078 | 4079 | 4095 | 4085 | 4084 | 4087 |

Step 8

Load Facet Output Look-up Tables into LUT 14.

In steps 4 and 6, it is preferable to use the cubic interpolation algorithm. A simple linear interpolation may be used if a large number of laser power data points are measured. Other interpolation algorithms can also be used which are well known to those skilled in the art.

Most practical interpolators can not extrapolate data outside of its table point range. In step 6, this situation occurs for low values of desired normalized laser powers because the gain factors are greater than or equal to 1. For example, if the scaled normalized laser powers range from 0.0095 to 1.00 for DAC code values from 0 to 4095, asking an interpolator to provide a DAC code value at a normalized laser power of 0.0093 will result in an incorrect value. Preferably, the software should set the DAC code value to zero in this region and not request the interpolator to extrapolate data outside of the table point range.

Steps 5 and 6 could be done using linear interpolation if the gain factor is applied to the desired normalized laser powers instead of the measured normalized laser powers. The large number (4096) of table points makes linear interpolation possible. The disadvantage is that the 4096 table points are input to the interpolator.

Finally, steps 5 and 6 could be done using a simple search routine in which for each facet a gain factor is applied to the desired normalized laser powers, then for each of the table points of the desired normalized laser powers, the gain factor scaled desired normalized laser power table is searched until the closes match is found. The associated DAC value is then stored. Since all gain factors are greater than or equal to 1, the search is always in one direction.

Although the invention has been described with reference to preferred embodiments herein, it will be understood that variations and modifications can be effected within the spirit and scope.

What is claimed is:

1. A method of producing a set of output look-up tables which correct for polygon facet reflectance differences in a polygon scanning laser imaging apparatus comprising the steps of:

determining the relative facet reflectance values for each facet of a multifacet polygon scanner where one of the facets is assigned a relative reflectance value of one;

determining the minimum relative reflectance facet and dividing all other facet reflectance values by the minimum relative reflectance value to produce a set of gain factors such that the minimum reflectance facet has a gain of one;

measuring laser power at several data points referenced to the DAC code value for the minimum reflectance facet and normalizing the laser power values to the laser power at DAC code value $2^n-1$;

for the minimum reflectance facet, interpolating the normalized laser powers for all DAC code values between code value 0 and code value $2^n-1$ to produce a look-up table for said minimum reflectance facet;

for each of said other facets of said polygon scanner, multiplying all other elements of the measured normalized laser power by the respective gain factor of each said facet; and for each of said other facets, interpolating the DAC code values for all of the desired normalized laser powers using ordered pairs of DAC code values and the gain factor scaled measured laser power as the table points for the interpolation to produce look-up tables for each of said other facets.

2. The method of claim 1 including the steps of providing a density calibration look-up table, and, for each of said facets, merging the DAC code value facet reflectance look-up table with said density calibration look-up table to produce a facet output look-up table for each of said facets.

3. A method of producing a set of output look-up tables which correct for polygon facet reflectance differences in a polygon scanning laser imaging apparatus comprising the steps of:

determining the relative facet reflectance values for each facet of a multifacet polygon scanner where one of the facets is assigned a relative reflectance value of one;

determining the minimum relative reflectance facet and dividing all other facet reflectance values by the minimum relative reflectance value to produce a set of gain factors such that the minimum reflectance facet has a gain of one;

measuring laser power at several data points referenced to the DAC code value for the minimum reflectance facet and normalizing the laser power values to the laser power at DAC code value $2^n-1$;

for the minimum reflectance facet, interpolating the normalized laser powers for all DAC code values between code value 0 and code value $2^n-1$ to produce a look-up table for said minimum reflectance facet;

for each of said other facets, of said polygon scanner, multiplying all elements of the desired normalized laser powers by the respective gain factor of each said facet; and for each of said other facets, then for each of the desired normalized laser power values, search the gain factor scaled desired normalized laser power table for a match to produce look-up tables for each of said other facets.

4. The method of claim 3 including the steps of providing a density calibration look-up table, and, for each of said facets, merging the DAC code value facet reflectance look-up table with said density calibration look-up table to produce a facet output look-up table for each of said facets.

* * * * *